Jan. 18, 1944.   J. W. PARA   2,339,290
MECHANICAL PENCIL
Filed Aug. 7, 1941
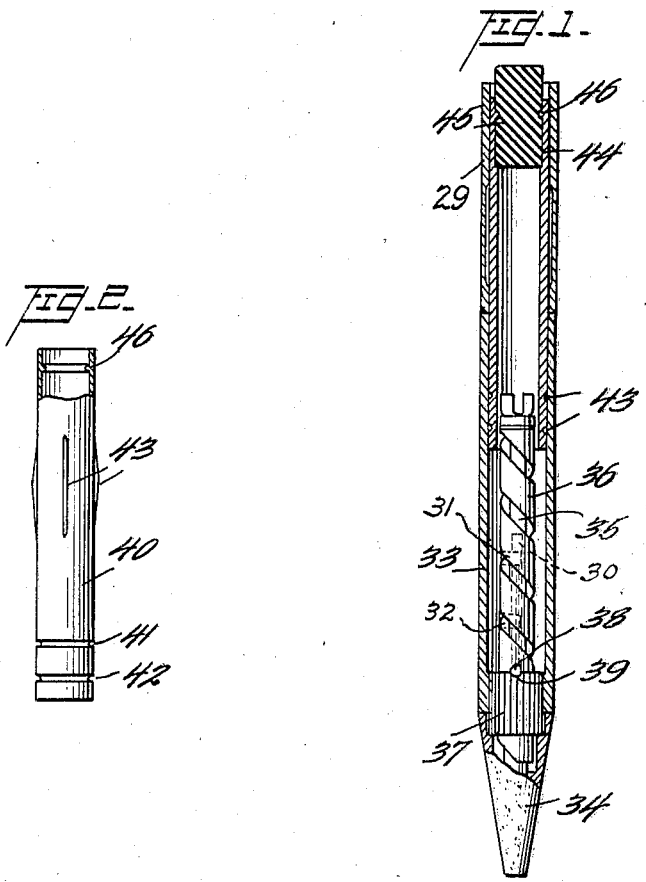
Inventor,
John William Para
By Ivan P. Tashof,
Attorney Patented Jan. 18, 1944

2,339,290

UNITED STATES PATENT OFFICE 2,339,290

MECHANICAL PENCIL

John William Para, Elizabeth, N. J., assignor to David Kahn, Inc., North Bergen, N. J., a corporation of New Jersey Application August 7, 1941, Serial No. 405,855

4 Claims. (Cl. 120—18)

The present invention relates to a mechanical pencil and more particularly to a mechanical pencil of the type adapted to receive relatively short leads and a novel coupling tube incorporated therein.

The present invention, in its more specific form, relates to a two-part pencil having a lower barrel section and an upper barrel section, said lower barrel section united to a plastic sleeve by means of a cementitious material. In the preferred form of the invention, the plastic sleeve is provided with a plurality of longitudinal ribs, said ribs being adapted to couple the plastic sleeve and upper barrel section.

An object of the present invention is to provide a coupling sleeve of a plastic type material which is adapted to be united with the lower half of a two part barrel and is provided with ribs engaging the upper barrel portion so that the entire barrel will turn as a unit relative to a pencil tip.

Another object of the present invention is to provide a coupling sleeve of a plastic type material having grooves therein capable of receiving a uniting cementitious material and producing a firm bond between the driving sleeve and a lower portion of a two part pencil barrel.

Another object of the present invention is to provide a pencil having a lower barrel portion and a plastic coupling sleeve adapted to be united to said lower barrel portion by a cementitious material, said barrel portion, plastic sleeve and cementitious material being capable of dissolving in a common solvent to thereby insure a common bond therebetween.

Other objects and advantages of the present invention will be apparent from the subsequent description and figures of the drawing, wherein:

Fig. 1 is a longitudinal section of a mechanical pencil made in accordance with the present invention; and Fig. 2 is a detail view, partly broken away, of the coupling sleeve shown in Fig. 1.

The barrel sections and the coupling sleeve of the present invention may be made from plastic materials, such as the following:

1. Phenol-formaldehyde resins, as, for example, Bakelite which is thermosetting in character. In other words, if Bakelite were used for molding or forming the tube of the present invention, the molding composition in its incompletely set form would be molded into shape and then heated to produce the final product by polymerization.

2. Furfural resins. These resins are also thermosetting in character and would be subsequently heated for complete polymerization after forming.

3. Urea and thiourea resins. Resins of this character are also thermosetting in character.

4. Glyptal. Some of the glyptal resins are thermosetting, while others are thermoplastic. In other words, the thermoplastic resins and glyptal resins when used can be shaped by applying heat to the desired form herein disclosed after having been initially supplied in bars or tubes.

5. Vinyl and styrene resins. These resins are generally produced by polymerizing styrene or vinyl-benzine. They are highly thermoplastic in character and easily molded by the application of heat. In many forms they are clear or colorless and are sufficiently tough and elastic for the purpose of the present invention.

6. Acrolein and acrylic acid resins. An example of this type of resins is that known as "Leucite." The acryl or acrolein resins are optically clear and have a high index of refraction. They present an extremely attractive appearance for a sleeve of this character for this reason. In addition they are extremely tough and sufficiently flexible for the present purposes.

7. Cellulose esters and ethers. Examples of this type of plastic are cellulose acetate and cellulose nitrate. These plastics are thermo-softening; in other words, they soften when heated and can be formed by suitable dies into a tube as set forth.

8. Hard rubber. Hard rubber differs from the soft flexible type of rubber in that it contains from 20% to 30% of sulphur. Hard rubber compositions in general are thermoplastic and can be molded to a suitable shape such as the tube of the present invention.

9. Chlorinated rubber. This material is thermoplastic in character and in sufficient thickness represents a thermoplastic material within the range of this invention. A form of chlorinated rubber is that product sold in sheets under the trade name of "Pliofilm."

10. Synthetic rubber compositions. These in general exhibit the same qualities as hard rubber and can be similarly used.

Referring to Figs. 1 and 2 of the drawing, the lower barrel section 33 is movably assembled with the tip 34. A runner tube 35 provided with the usual slot extending longitudinally thereof is adapted to receive the ejector lug 31 of the ejector member and the lug 32 of the lead carrier 30. The lugs 31 and 32 cooperate with the convolutions of the spiral 36. The runner tube 35 is immovably fixed to the tip 34 in any suitable manner. The spiral 36 rotatably surrounds the runner tube 35, and the relative rotation of the runner tube 35 and the spiral 36 will drive the lead through the medium of the lead carrier 30. The relative movement of the spiral 36 on the runner tube 35 will move the lugs 32 and 31 upwardly and downwardly so that they may expel and retract lead within the pencil in the well known conventional manner. As shown, the spiral is connected to rotate with the barrel 33 by means of a bushing 37. The bushing 37 is provided with a ribbed outer surface which prevents relative movement between the bushing and the barrel, inasmuch as the ribs are forced into the inner barrel surface. The projection 38 on the spiral 36 is received in a notch 39 in the bushing 37 to complete the coupling connection between the barrel 33 and the spiral 36.

In the pencil set forth, movement of the tip 34 relative to the barrel 33 will correspondingly move the runner tube 35 relative to the barrel 33, the bushing 37, and the spiral 36, to correspondingly move the lead. In order that the lower barrel 33 may be simultaneously moved with an upper barrel section 29 the coupling sleeve 40 is provided. The sleeve 40 may be formed from any of the materials herein previously set forth, said sleeve also functioning as a magazine for leads.

The sleeve 40 is provided at its lower end with a plurality of grooves of which two, 41 and 42 are shown. These grooves 41 and 42 are adapted to retain a suitable cement as indicated in Fig. 6 at 43. This cement may contain a solvent for the material of the barrel 33 and also for the plastic driver tube 40. Thus the cement may contain an organic solvent such as acetone in addition to the usual fillers, plastics, etc. Preferably the cement may also contain in dissolved form a plastic material similar to the material of the barrel and the material of the coupling sleeve 40, so that upon solidification of the cement a homogeneous bond is formed between the sleeve 40 and the barrel 33.

The upper central portion of the sleeve 40 is provided with ribs 43 which cooperate with the upper barrel section 29 and function to couple said sleeve and upper barrel section together. The upper portion of the sleeve 40 is provided with an enlarged bore portion 44 adapted to receive an eraser 45. Projecting from the walls of the bore 44 adjacent the upper end of the sleeve 40 is an inward bead 46. The bead 46 projects into the relatively resilient eraser 45 and serves to firmly retain the eraser in the bore 45.

The tip member 34, being made of the same plastic material as the barrel, has the same coefficient of expansion as the barrel member, this being highly advantageous. Further, the tip member and the barrel being made of the same plastic material, these members are affected by atmospheric influences to the same degree. When metal tips were made the latter, in many instances, tarnished.

While a plastic tip may advantageously be used, of course, a metallic tip may also be used.

Having thus described the invention, what I claim as new and desire to secure by Letters Patent is:

1. In a mechanical pencil including a runner tube member and an actuating spiral member movable relative to said runner tube member to advance lead, a lower barrel section housing said runner tube and spiral members, and a plastic sleeve partly within said lower barrel section, and extending therefrom, said sleeve being provided with a groove about its lower periphery, and a cementitious material within said groove bonding said sleeve and lower barrel portion.

2. In a mechanical pencil including a runner tube member and an actuating spiral member movable relative to said runner tube member to advance lead, a lower barrel section housing said runner tube and spiral members, and a plastic sleeve partly within said lower barrel section and extending therefrom, said sleeve being provided with a groove about its lower periphery, and a cementitious material within said groove bonding said sleeve and lower barrel portion, said cementitious material being capable of dissolving in a common solvent for the plastic sleeve and lower barrel portion to thereby form a homogeneous bond therebetween.

3. In a mechanical pencil including a runner tube member and an actuating spiral member movable relative to said runner tube member to advance lead, a lower barrel section housing said runner tube and spiral members, a plastic sleeve partly within said lower barrel section and extending therefrom, said sleeve being provided with a groove about its lower periphery, a cementitious material within said groove bonding said sleeve and lower barrel portion, said cementitious material being capable of dissolving in a common solvent for the plastic sleeve and lower barrel portion to thereby form a homogeneous bond therebetween, an upper barrel section, and a plurality of longitudinal ribs on said plastic sleeve fitting within said upper barrel section to couple said sleeve and upper barrel section.

4. In a mechanical pencil including a runner tube member and an actuating spiral member movable relative to said runner tube member to advance lead, a lower barrel section housing said runner tube and spiral members, and a plastic sleeve partly within said lower barrel section and extending therefrom, said sleeve being provided with a groove about its lower periphery, a cementitious material within said groove bonding said sleeve and lower barrel portion, an upper barrel section, and a plurality of longitudinal ribs on said plastic sleeve fitting within said upper barrel section to couple said sleeve and upper barrel section.

JOHN WILLIAM PARA.